United States Patent Office 3,361,450
Patented Jan. 2, 1968

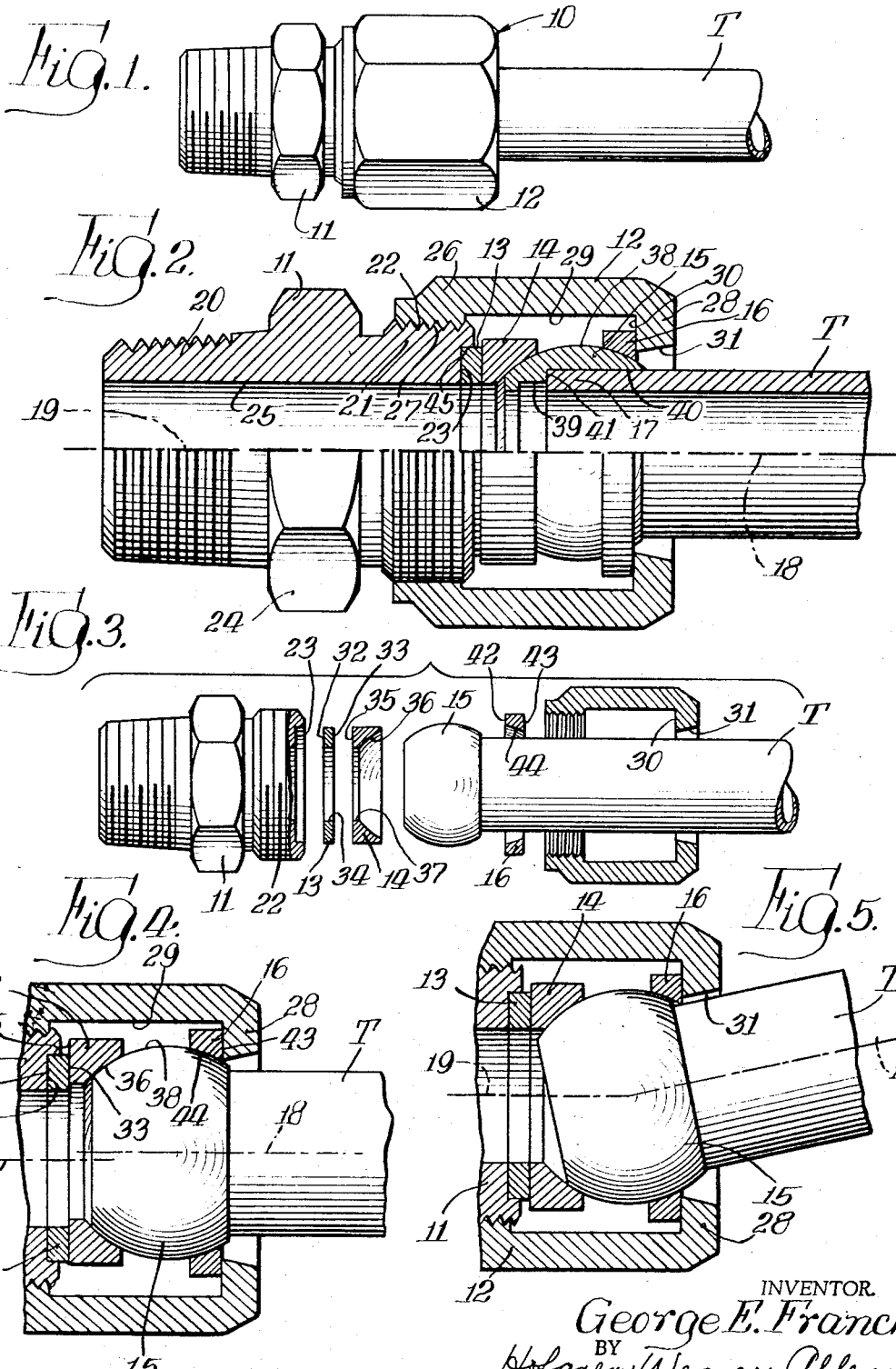

3,361,450
LATERALLY AND ANGULARLY ADJUSTABLE TUBE FITTING
George E. Franck, Morton Grove, Ill., assignor to Imperial-Eastman Corporation, a corporation of Illinois
Filed Aug. 19, 1964, Ser. No. 390,589
4 Claims. (Cl. 285—271)

This invention relates to tube fittings and in particular to fittings for use with straight-ended tubes.

For use in coupling the end of a straight-ended tube to an element, a conventional fitting may be employed which includes a body member adapted to be sealingly secured to the element and a sealing means for sealingly securing the tube end to the body member. A problem arises in coupling such tubing in that the tubing may not be accurately positioned or aligned relative to the element, that is, the tubing may extend at an angle relative to the portion of the element to which the body member is connected and/or may be spaced transversely, or laterally, from an axially aligned position relative to the body member when the body member is installed on the element. A number of fittings has been developed providing for such angular and lateral misalignment. The known fittings, however, have the disadvantages of relatively complex and costly construction and difficulty of obtaining the desired positive sealed connection of the tube to the element. The present invention comprehends an improved fitting eliminating the disadvantages of the above discussed conventional fittings in a novel and simple manner.

Thus, a principal object of the present invention is the provision of a new and improved tube fitting.

Another object of the invention is the provision of such a tube fitting having new and improved means for accommodating misalignment of the tube end relative to the body member and element to which the body member is connected.

A further object of the invention is the provision of such a tube fitting having new and improved means for accommodating angular misalignment of the tube end relative to the body member and element.

A still further object of the invention is the provision of such a tube fitting having new and improved means for accommodating angular misalignment of the tube end relative to the body member and element.

A still further object of the invention is the provision of such a tube fitting including a body member having an inner end and a through bore opening through said inner end, and seal means associated with the inner end of the body member defining an axially inner, planar surface, an annular nut member having an inner end provided with an axially outwardly facing, radially inner planar shoulder, the nut member and body member having cooperating means for effecting forceful movement of the shoulder toward the inner end of the body member, a first annular sealing ring having an axially outer planar surface sealingly engaging the planar axially inner surface of the body member means, and an axially inner spherical surface, a second sealing ring having a radially outer spherical surface sealingly engaging the spherical surface of the first ring, and a through bore including an axially inner, cylindrical portion for sealingly receiving the end of a tube to be coupled and having a planar tube-stop surface at the axially outer end of the cylindrical portion, and a third sealing ring having a radially inner spherical surface sealingly engaging the spherical surface of the second ring and an axially inner, planar surface engaged by the shoulder of the nut member, whereby the second ring may be selectively positioned at any one of a plurality of different angular positions relative to the axis of the body member and each of the first and third rings may have the axis thereof disposed at any one of a plurality of spacings from the axis of the body member.

Other objects and advantages of the invention will be apparent from the following description taken in connection with the accompanying drawing wherein:

FIGURE 1 is an elevation of a fitting embodying the invention having a tube end connected thereto;

FIGURE 2 is an enlarged view, half in diametric section and half in elevation thereof;

FIGURE 3 is an exploded elevational view thereof;

FIGURE 4 is a fragmentary enlarged view partially in diametric section and partially in elevation illustrating the arrangement of the fitting and tube end where the tube end is axially transversely disaligned relative to the nut member; and FIGURE 5 is a fragmentary enlarged view partially in diametric section and partially in elevation illustrating the arrangement of the fitting and tube end where the tube end is angularly misaligned relative to the nut member.

In the exemplary embodiment of the invention as disclosed in the drawing, a fitting generally designated 10 is shown to comprise a body member 11, a nut member 12, a first sealing ring 13, a second sealing ring 14, a third sealing ring 15, and a fourth sealing ring 16. The third sealing ring 15 is arranged to be installed on the end 17 of a tube T to be coupled, and the nut member 12 is arranged to act through the fourth sealing ring 16, the third sealing ring 15, the second sealing ring 14, and the first sealing ring 13 to sealingly secure the tube end with the third sealing ring 15 thereon to the body member 11 in a made-up arrangement of the fitting. In such made-up arrangement of the fitting, the tube T may have its axis 18 disposed in any one of a plurality of different positions angularly and transversely related to the axis 19 of the body member 11, thereby to accommodate axial and transverse misalignment of the tube end relative to the element (not shown) to which the body member 11 is connected.

More specifically, the body member 11 includes an axially outer, exteriorly threaded end 20 adapted to be threadedly secured to the element (not shown) to which the tube T is to be connected. The body member further includes an axially inner end 21 having an external thread 22, an annular radial end surface 23 radially outwardly defined by a cylindrical surface 45. Between ends 20 and 21, the body member is provided exteriorly with a plurality of flats 24 arranged to be engaged by a suitable conventional tool (not shown), such as a wrench, during make-up of the fitting. A through bore 25 extends axially end-to-end through the body member to open coaxially through the end surface 23.

Nut member 12 includes an outer end 26 having an internal thread 27 adapted for threaded engagement with the thread 22 of the body member. The inner end of the nut member 12 defines an inturned annular flange 28. Extending axially through the nut member 12 is a through bore 29 defined at end portion 28 by a planar radial, axially outwardly facing shoulder 30 and a frustoconical, axially inwardly widening, radially inner surface 31.

First sealing ring 13 comprises an annular member having a radial axially outer face 32 and a radial axially inner face 33. The bore 34 of ring 13 has a diameter substantially equal to the bore 25 of the body member 11, and the outside diameter of the ring 13 is substantially equal to the diameter of the cylindrical surface 45 of the body member 11, whereby the ring 13 is locked against transverse displacement relative to the body member. Herein the sealing ring 13 is formed of high purity aluminum which effectively comprises a dead soft material.

The purity of the material is preferably at least approximately 99 percent.

Sealing ring 14 comprises an annular metal member having an axially outer radial surface 35 and an inner spherical surface 36. The diameter of the bore 37 of the ring 14 is preferably substantially equal to the diameter of bores 34 and 35.

This third sealing ring 15 comprises an annular ball element having an exterior spherical surface 38 having a radius of curvature substantially equal to that of the spherical surface 36. The bore 39 of the ring 15 includes a cylindrical axially inner portion 40 adapted to receive the end 17 of the tube T. At the axially outer end of the surface 40, the bore 39 is defined by a radial tube-stop surface 41 against which the inner end of the tube abuts when the ring 15 is installed thereon. The ring 15 is preferably sealingly secured to the tube end 17 by brazing or the like between the surface 40 and the outer surface of the tube T.

The fourth sealing ring 16 includes an axially outer, radial surface 42, an axially inner, radial surface 43, and a radially inner, spherical surface 44. The radius of curvature of surface 44 is substantially equal to that of the spherical surfaces 38 and 36, respectively.

Turning now to FIGURES 4 and 5, the arrangement of the fitting in the made-up condition thereof may be seen in both axially transversely misaligned and angularly misaligned positions. Referring first FIGURE 4, the arrangement of the fitting where the tube T is disposed with its axis 18 spaced laterally from the axis 19 of the body member is shown. Therein, the second sealing ring 14 and the fourth sealing ring 16 are shown to be axially transversely displaced relative to the axis 19 of the body member to accommodate an axial transverse displacement of the ball sealing ring 15 carried on the end of the tube T. This displacement is permitted by the radial clearance between the sealing rings 14 and 16 and to the cylindrical surface 29 of the nut bore. Thus, notwithstanding a substantial axial transverse displacement of the axes of the sealing rings 14 and 16, a sealed connection of the tube T to the body member 11 is readily effected by the advancement of the nut 12 toward the body member as a result of the threaded engagement of the nut member thread 27 with the body member thread 22. As shown in FIGURE 4, a sealing force is directed by the nut member flange 28 against the surface 43 of the ring 16 which acts through the spherical surfaces 44 and 38 to the spherical surface 36 of the second ring 14, thereby to sealingly engage surfaces 38 and 36. The pressure force is continued through the ring 14 surface 35 against ring 13 surface 33 and through ring 13 from surface 32 thereof against body member surface 23 to provide sealing engagement of surface 35 with surface 33 and sealing engagement of surface 32 with surface 23, thereby to complete the sealing connection of the tube T to the body member 11.

Referring now to FIGURE 5, the arrangement of the fitting where the tube T is axially angularly disaligned relative to the axis 19 of the body member is illlustrated. Thus, as shown in FIGURE 5, the second ring 14 and fourth ring 16 are coaxially aligned with axis 19, whereas the ball ring 15 carried on the end of the tube T is turned to remain coaxially aligned with the tube T, and, thus, axially disaligned with the body member axis 19. The effect of the nut member flange 28 in providing the sealing connecting forces is similar to that described in connection with FIGURE 4. The permissible angularity of the tube T is limited solely by the arrangement of surface 31 which may be abutted by the tube T or ring 15 in the maximum displaced condition.

Obviously, any combination of the axial transverse displacement and axial misalignment conditions illustrated in FIGURES 4 and 5 may be accommodated in the fitting 10, up to the limit of such displacement in misalignment permitted by the surface 31.

Thus, in effect, the fitting 10 provides a ball type connection wherein the spherical sealing surfaces engaged by the ball element are themselves transversely displaceable to accommodate transverse displacements of the tube relative to the body member while yet providing a positive sealed connection of the tube to the body member in each of the different transversely and angularly misaligned positions.

The fitting 10 is extremely simple and economical of construction while providing highly improved flexibility in the connecting of tubes to elements eliminating the need for axial transverse and angular alignment, while yet providing a positive sealed connection in a simple manner.

While I have shown and described one embodiment of my invention, it is to be understood that it is capable of many modifications. Changes, therefore, in the construction and arrangement may be made without departing from the spirit and scope of the invention as defined in the appended claims.

I claim:
1. A fitting for use with straight-ended tubing, comprising: a body member having an inner end defined by an annular radial end surface radially outwardly defined by an annular shoulder surface and a through bore opening through said inner end; an annular nut member having an inner end provided with an axially outwardly facing, radially inner planar shoulder, said nut member and body member having cooperating means for effecting forceful movement of said shoulder toward said inner end of the body member; a first annular sealing ring formed of a substantially dead soft material and having an axially outer radially extending surface sealingly engaging said inner end of the body member and an axially inner, planar radially extending surface spaced axially inwardly of said inner end of the body member, the radial extent of said first annular sealing ring being substantially equal to the dimension of said annular shoulder surface and less than the radial extent of said inner end of the body member; a second annular sealing ring having an axially outer surface sealingly engaging said planar axially inner surface of said first sealing ring, and an axially inner spherical surface; a third sealing ring having a radially outer spherical surface sealingly engaging said spherical surface of the second ring, and a through bore including an axially inner, cylindrical portion for sealingly receiving the end of a tube to be coupled and having a planar tube-stop surface at the axially outer end of said cylindrical portion; and a fourth sealing ring having a radially inner spherical surface sealingly engaging said spherical surface of said third ring and an axially inner, planar surface engaged by said shoulder of the nut member, said spherical surface of said third sealing ring being continuous at least in the areas proximate to said second and fourth sealing rings, said sealing rings, body member and nut member all being so constructed and arranged that during all allowable angular and lateral movement thereof all the said sealing surfaces remain in sealing engagement, whereby said third ring may be selectively positioned at any one of a plurality of different angular positions relative to the axis of said body member and each of said second and fourth rings may have the axis thereof disposed at any one of a plurality of spacings from said axis of the body member.

2. The fitting of claim 1 wherein said first ring is formed of high purity aluminum.

3. The fitting of claim 1 wherein said first sealing ring projects approximately one-half its axial extent from said inner end of the body member.

4. The fitting of claim 1 wherein said inner surface of said first sealing ring has a radial extent at least only slightly less than the radial extent of said axially outer surface of said second sealing ring.

(References on following page)

References Cited

UNITED STATES PATENTS

| | | | |
|---|---|---|---|
| 631,064 | 8/1899 | Dart | 285—332.3 |
| 871,757 | 11/1907 | Greenlaw | 285—267 |
| 1,345,334 | 6/1920 | Stafford | 285—271 |
| 1,615,536 | 1/1927 | Del Mar | 285—332.3 X |
| 1,708,736 | 4/1929 | Pallady | 285—271 |
| 2,477,762 | 8/1949 | Monroe | 285—266 |
| 2,520,896 | 8/1950 | Smulski | 285—329 X |
| 2,628,112 | 2/1953 | Hebard | 285—264 X |
| 3,233,921 | 2/1966 | Holmgren et al. | 285—110 |
| 3,243,209 | 3/1966 | Chertok | 285—261 |

FOREIGN PATENTS

| | | |
|---|---|---|
| 745,777 | 2/1956 | Great Britain. |

CARL W. TOMLIN, *Primary Examiner.*

D. W. AROLA, *Assistant Examiner.*